C. LONG.
Improvement in Animal-Traps.
No. 115,222.   Patented May 23, 1871.
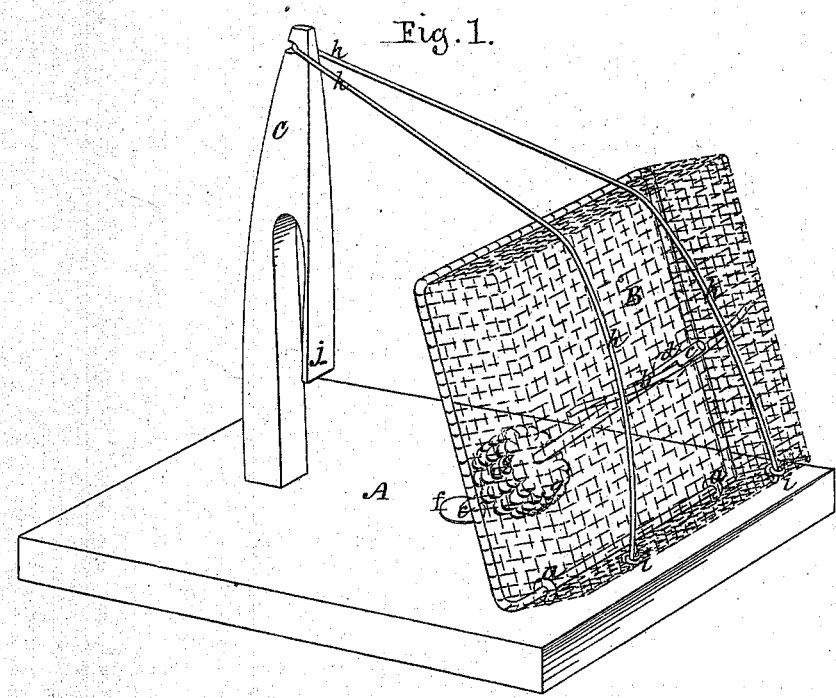
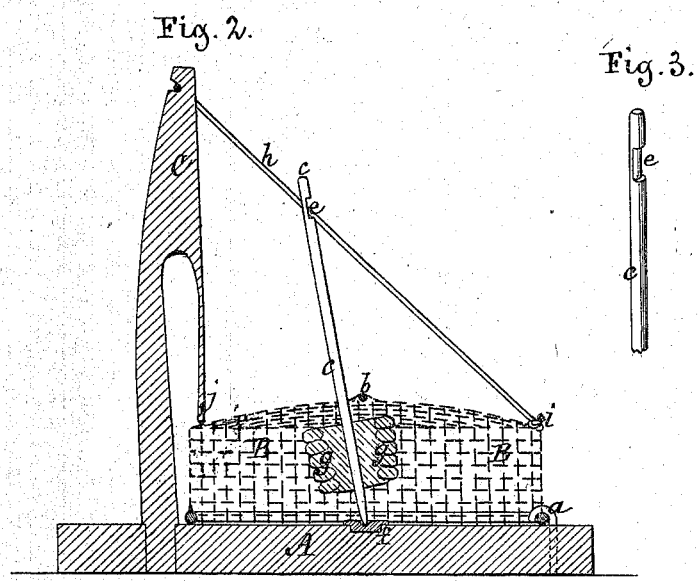
Witnesses
Jno. D. Patten
Edmund Masson
Christopher Long.
By atty. A. B. Stoughton.

UNITED STATES PATENT OFFICE.

CHRISTOPHER LONG, OF NEWARK, OHIO.

IMPROVEMENT IN ANIMAL-TRAPS.

Specification forming part of Letters Patent No. 115,222, dated May 23, 1871.

*To all whom it may concern:*

Be it known that I, CHRISTOPHER LONG, of Newark, in the county of Licking and State of Ohio, have invented certain new and useful Improvements in Animal-Traps; and I do hereby declare the following to be a full, clear, and exact description of the same, reference being had to the accompanying drawing making a part of this specification, in which—

Figure 1 represents the trap in perspective and as it appears when baited and set; Fig. 2 represents a vertical section through the same as it appears when sprung or down; and Fig. 3 represents the form of the recess in the bent spindle or trigger.

Similar letters, where they occur in the separate figures, denote like parts of the trap in the drawing.

My invention relates more especially to the use, in an animal-trap of the drop kind, of a turning spindle or bait-rod, having a rounded shoulder or recess which catches over the drop portion to hold it up, and the least turning of which spindle trips the catch and allows the box or cover to drop, or be quickly drawn down by the reaction of an expanded spring, or by a weight or other similar mechanism.

To enable others skilled in the art to make and use my invention, I will proceed to describe the same with reference to the drawing.

A represents a base, board, or block, on which the trap is arranged. The cover, box, or drop portion of the trap B I prefer to make of woven wire, and it may be of such shape, form, or size as may be best adapted to its special purpose. This box or cover B is hinged to the base A, as seen at $a$; and secured to its top portion there is a wire or rod, $b$, over which the spindle $c$, or rather a shoulder or recess, $e$, in said spindle, catches, to hold up or set the trap, said spindle projecting through an opening, $d$, in said top, and extending far enough through to be caught and manipulated in setting the trap. On the base A there is a step, $f$, in which the bottom of the spindle rests, and in which it may be easily rolled or turned; and the bottom of the recess or shoulder $e$, near the top of the spindle, is rounded, so that it will easily roll or move on the wire or rod $b$, over or against which it catches. The bait $g$ is put upon the spindle $c$, and whether the bottom of the spindle be moved out of or turns or rolls the least in its step, the trap is sprung. A post, C, is set in the base A, over the top of which a gum-elastic cord, $h$, is passed, said cord being fastened to the rear of the box or lid B, as at $i\ i$.

When the trap is set, this cord $h$ is expanded, and when the said lid or cover is tripped or released by the moving of the spindle, the cord contracts and draws over and downward said cover upon the animal, and in falling it passes by and under a spring, $j$, on the post C, which holds it down.

I find the rubber cord to be cheap and efficient, but the same force or power may be attained by any other spring, or even by a falling weight.

The bait should be fastened to the spindle so that any movement of the bait would also roll or move the spindle, and so roll its recess out of contact with the rod or wire $b$, and allow it to spring down or shut.

Having thus fully described my invention, what I claim therein as new, and desire to secure by Letters Patent, is—

In combination with a spring-trap, substantially such as described, a turning spindle, $c$, with a rounded notch or shoulder, $e$, and which spindle serves as a trigger and bait-rod, as represented.

CHRISTOPHER LONG.

Witnesses:
A. B. STOUGHTON,
EDMUND MASSON.